(12) United States Patent
Mohammad Mirzaei et al.

(10) Patent No.: US 9,648,458 B2
(45) Date of Patent: May 9, 2017

(54) SYSTEMS AND METHODS FOR LABELING CROWD SOURCED DATA

(71) Applicant: QUALCOMM Incorporated, San Diego, CA (US)

(72) Inventors: Faraz Mohammad Mirzaei, San Jose, CA (US); Saumitra Mohan Das, Santa Clara, CA (US); Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 13/934,725

(22) Filed: Jul. 3, 2013

(65) Prior Publication Data
US 2015/0011246 A1    Jan. 8, 2015

(51) Int. Cl.
| | |
|---|---|
| *H04W 24/00* | (2009.01) |
| *H04W 4/02* | (2009.01) |
| *H04W 4/04* | (2009.01) |
| *G01C 5/06* | (2006.01) |
| *G01C 21/20* | (2006.01) |
| *G01S 5/02* | (2010.01) |

(52) U.S. Cl.
CPC .............. *H04W 4/023* (2013.01); *G01C 5/06* (2013.01); *G01C 21/206* (2013.01); *G01S 5/0252* (2013.01); *H04W 4/043* (2013.01)

(58) Field of Classification Search
USPC ......... 455/404.1, 404.2, 452.2, 456.1, 456.2, 455/456.3, 415; 702/2–3, 36, 47, 98
See application file for complete search history.

(56) References Cited

U.S. PATENT DOCUMENTS

| | | | | |
|---|---|---|---|---|
| 7,751,949 | B2* | 7/2010 | Alanen | G01O 5/06 342/357.2 |
| 8,818,403 | B1* | 8/2014 | Gauba | H04W 24/00 455/11.1 |
| 2008/0280635 | A1* | 11/2008 | Lei | H04W 8/005 455/513 |
| 2010/0049744 | A1* | 2/2010 | Zhao | H04B 1/3805 702/186 |
| 2010/0325712 | A1* | 12/2010 | Kakuta et al. | 726/7 |

(Continued)

FOREIGN PATENT DOCUMENTS

| | | |
|---|---|---|
| CN | 101477188 A | 7/2009 |
| CN | 101846736 A | 9/2010 |

OTHER PUBLICATIONS

International Search Report and Written Opinion—PCT/US2014/044938—ISA/EPO—Oct. 10, 2014.

*Primary Examiner* — Dai A Phuong
(74) *Attorney, Agent, or Firm* — Kilpatrick Townsend & Stockton, LLP

(57) ABSTRACT

Methods, systems, computer-readable media, and apparatuses for labeling crowd sourced data are presented. In some embodiments, a method for labeling crowd sourced data may include: receiving an atmospheric pressure signal from a mobile device associated with a venue, the mobile device comprising an atmospheric pressure sensor; clustering a plurality of atmospheric pressure signals from a plurality of mobile devices associated with the venue into a plurality of clusters; assigning a label to each of the plurality of clusters; receiving signal measurements from one or more of the plurality of mobile devices; and applying the label to the signal measurement.

60 Claims, 6 Drawing Sheets

(56) References Cited

U.S. PATENT DOCUMENTS

| | | |
|---|---|---|
| 2011/0090081 A1* | 4/2011 | Khorashadi et al. .... 340/539.13 |
| 2011/0200023 A1* | 8/2011 | Murray ................... G01S 5/02 370/338 |
| 2012/0013475 A1 | 1/2012 | Farley et al. |
| 2012/0015665 A1 | 1/2012 | Farley et al. |
| 2012/0172052 A1* | 7/2012 | Jeong ........................ 455/456.1 |
| 2012/0182180 A1 | 7/2012 | Wolf et al. |
| 2012/0253674 A1* | 10/2012 | Kamiwada ........... G01C 21/206 702/3 |
| 2012/0270564 A1 | 10/2012 | Gum et al. |
| 2012/0309408 A1* | 12/2012 | Marti et al. ................ 455/456.1 |
| 2013/0079039 A1 | 3/2013 | Heikkilae et al. |
| 2015/0172852 A1* | 6/2015 | Joo ................... H04M 1/72569 455/41.2 |
| 2015/0319573 A1* | 11/2015 | Huang ............. H04M 1/72572 455/456.1 |
| 2015/0365802 A1* | 12/2015 | Barr ..................... H04W 4/025 455/456.3 |
| 2016/0084936 A1* | 3/2016 | Smith .................. H04W 64/00 455/456.1 |
| 2016/0198308 A1* | 7/2016 | Marti ................... G01S 5/0252 455/456.1 |

\* cited by examiner

SYSTEMS AND METHODS FOR LABELING CROWD SOURCED DATA

BACKGROUND

Many mobile devices include some form of location determination hardware and software. However, this location determination capability may not be configured to provide the user's location within more confined areas, such as buildings. Thus, while a user may be able to determine his or her location at a macro level (e.g., address or grid coordinates), the user may not be able to determine his or her location to a more specific level. Similarly, some mobile devices do not include every location determination feature. These mobile devices may be able to take advantage of data gathered from other mobile devices that comprise additional location determination hardware and software. By doing so, a mobile device may be able to make more specific determinations using other available information.

BRIEF SUMMARY

Certain embodiments are described that automatically apply labels to crowd sourced data. For example, in one embodiment, a method for labeling crowd sourced data, may comprise: receiving an atmospheric pressure signal from a mobile device associated with a venue; clustering a plurality of atmospheric pressure signals from a plurality of mobile devices associated with the venue into a plurality of clusters; assigning a label to each of the plurality of clusters; receiving signal measurements from one or more of the plurality of mobile devices; and applying the label to the signal measurements.

In another embodiment of a method for labeling crowd sourced data the atmospheric pressure signal may be obtained from one or more of: a barometric pressure sensor, an altitude sensor, an absolute pressure sensor, or a relative pressure sensor.

In another embodiment of a method for labeling crowd sourced data the signal measurement may comprise one or more of a Received Signal Strength Indicator (RSSI) or Round Trip Time (RTT) measurement.

In another embodiment of a method for labeling crowd sourced data the venue may comprise building with a plurality of floors.

In another embodiment of a method for labeling crowd sourced data each of the plurality of clusters is associated with one of the plurality of floors.

In another embodiment of a method for labeling crowd sourced data the label may be associated with a floor of the building the device is on.

In another embodiment a method for labeling crowd sourced data may further comprise: removing one or more outliers from the plurality of atmospheric pressure signals.

In another embodiment a method for labeling crowd sourced data may further comprise: associating a time of measurement with each of the plurality of atmospheric pressure signals; and removing one or more of the plurality of atmospheric pressure signals that are older than a certain length of time.

In another embodiment a method for labeling crowd sourced data may further comprise: comparing one or more of the plurality of clusters to a known pressure value.

In another embodiment of a method for labeling crowd sourced data each of the plurality of clusters may comprise a plurality of atmospheric pressure signals of a similar value.

In another embodiment, an apparatus for labeling crowd sourced data may comprise: a processor configured to: receive an atmospheric pressure signal from a mobile device associated with a venue; cluster a plurality of atmospheric pressure signals from a plurality of mobile devices associated with the venue into a plurality of clusters; assign a label to each of the plurality of clusters; receive signal measurements from one or more of the plurality of mobile devices; and apply the label to the signal measurement.

In another embodiment, the atmospheric pressure signal may be obtained from one or more of: a barometric pressure sensor, an altitude sensor, an absolute pressure sensor, or a relative pressure sensor.

In another embodiment, the signal measurement may comprise one or more of a Received Signal Strength Indicator (RSSI) or Round Trip Time (RTT) measurement.

In another embodiment, the venue may comprise a building with a plurality of floors.

In another embodiment, each of the plurality of clusters is associated with one of the plurality of floors.

In another embodiment, the label is associated with the floor of the building the device is on.

In another embodiment, the processor is further configured to: remove one or more outliers from the plurality of atmospheric pressure signals.

In another embodiment, the processor is further configured to: associate a time of measurement with each of the plurality of atmospheric pressure signals; and remove one or more of the plurality of atmospheric pressure signals that are older than a certain length of time.

In another embodiment, the processor is further configured to: compare one or more of the plurality of clusters to a known pressure value.

In another embodiment, each of the plurality of clusters comprises a plurality of atmospheric pressure signals of a similar value.

In another embodiment, an apparatus for labeling crowd sourced data may comprise: a means for receiving an atmospheric pressure signal from a mobile device associated with a venue; a means for clustering a plurality of atmospheric pressure signals from a plurality of mobile devices associated with the venue into a plurality of clusters; a means for assigning a label to each of the plurality of clusters; a means for receiving signal measurements from one or more of the plurality of mobile devices; and a means for applying the label to the signal measurement.

In another embodiment, the atmospheric pressure signal is obtained from one or more of: a barometric pressure sensor, an altitude sensor, an absolute pressure sensor, or a relative pressure sensor.

In another embodiment, the signal measurement comprises one or more of a Received Signal Strength Indicator (RSSI) or Round Trip Time (RTT) measurement.

In another embodiment, the venue comprises a building with a plurality of floors.

In another embodiment, each of the plurality of clusters is associated with one of the plurality of floors.

In another embodiment, the label is associated with the floor of the building the device is on.

In another embodiment, the apparatus further comprises: a means for removing one or more outliers from the plurality of atmospheric pressure signals.

In another embodiment, the apparatus further comprises: a means for associating a time of measurement with each of the plurality of atmospheric pressure signals; and a means for removing one or more of the plurality of atmospheric pressure signals that are older than a certain length of time.

In another embodiment, the apparatus further comprises a means for comparing one or more of the plurality of clusters to a known pressure value.

In another embodiment, each of the plurality of clusters comprises a plurality of atmospheric pressure signals of a similar value.

In another embodiment of the present disclosure, and apparatus for labeling crowd sourced data may comprise: a non-transitory computer readable medium comprising program code, which when executed by a processor is configured to cause the processor to: receive an atmospheric pressure signal from a mobile device associated with a venue; cluster a plurality of atmospheric pressure signals from a plurality of mobile devices associated with the venue into a plurality of clusters; assign a label to each of the plurality of clusters; receive signal measurements from one or more of the plurality of mobile devices; and apply the label to the signal measurement.

In another embodiment, the atmospheric pressure signal is obtained from one or more of: a barometric pressure sensor, an altitude sensor, an absolute pressure sensor, or a relative pressure sensor.

In another embodiment, the signal measurement comprises one or more of a Received Signal Strength Indicator (RSSI) or Round Trip Time (RTT) measurement.

In another embodiment, the venue comprises a building with a plurality of floors.

In another embodiment, each of the plurality of clusters is associated with one of the plurality of floors.

In another embodiment, the label is associated with a floor of the building the device is on.

In another embodiment, the non-transitory computer readable medium further comprises program code, which when executed by the processor is configured to cause the processor to: remove one or more outliers from the plurality of atmospheric pressure signals.

In another embodiment, the non-transitory computer readable medium further comprises program code, which when executed by the processor is configured to cause the processor to: associate a time of measurement with each of the plurality of atmospheric pressure signals; and remove one or more of the plurality of atmospheric pressure signals that are older than a certain length of time.

In another embodiment, the non-transitory computer readable medium further comprises program code, which when executed by a processor is configured to cause the processor to: compare one or more of the plurality of clusters to a known pressure value.

In another embodiment, each of the plurality of clusters comprises a plurality of atmospheric pressure signals of a similar value.

In another embodiment, a method for labeling crowd sourced data comprises: measuring the atmospheric pressure at a location associated with a venue; transmitting a first signal to a remote location, the first signal associated with the measured atmospheric pressure; determining a signal measurement associated with a wireless network; transmitting a second signal to the remote location, the second signal associated with the signal measurement; receiving a data signal from the remote location, the data signal comprising information associated with the location.

In another embodiment, the atmospheric pressure is measured by one or more of: a barometric pressure sensor, an altitude sensor, an absolute pressure sensor, or a relative pressure sensor.

In another embodiment, the signal measurement comprises one or more of a Received Signal Strength Indicator (RSSI) or Round Trip Time (RTT) measurement.

In another embodiment, the venue comprises a building with a plurality of floors.

In another embodiment, the method further comprises: receiving information associated with a feature of one or more of the plurality of floors.

In another embodiment, an apparatus for labeling crowd sourced data comprises: a sensor configured to measure the atmospheric pressure at a location associated with a venue; a processor configured to: transmit a first signal to a remote location, the first signal associated with the measured atmospheric pressure; determine a signal measurement associated with a wireless network; transmit a second signal to the remote location, the second signal associated with the signal measurement; receive a data signal from the remote location, the data signal comprising information associated with the location.

In another embodiment, the sensor comprises one or more of: a barometric pressure sensor, an altitude sensor, an absolute pressure sensor, or a relative pressure sensor.

In another embodiment, the signal measurement comprises one or more of a Received Signal Strength Indicator (RSSI) or Round Trip Time (RTT) measurement.

In another embodiment, the venue comprises a building with a plurality of floors.

In another embodiment, the processor is further configured to receive information associated with a feature of one or more of the plurality of floors.

In another embodiment, an apparatus for labeling crowd sourced data comprises: a means for measuring the atmospheric pressure at a location associated with a venue; a means for transmitting a first signal to a remote location, the first signal associated with the measured atmospheric pressure; a means for determining a signal measurement associated with a wireless network; a means for transmitting a second signal to the remote location, the second signal associated with the signal measurement; a means for receiving a data signal from the remote location, the data signal comprising information associated with the location.

In another embodiment, the means for measuring the atmospheric pressure comprises one or more of: a means for measuring barometric pressure, a means for measuring altitude, a means for measuring absolute pressure, or a means for measuring relative pressure.

In another embodiment, the means for determining a signal measurement comprises one or more of a means for measuring a Received Signal Strength Indicator (RSSI) or a means for measuring a Round Trip Time (RTT) measurement.

In another embodiment, the venue comprises a building with a plurality of floors.

In another embodiment, the apparatus further comprises: a means for receiving information associated with a feature of one or more of the plurality of floors.

In another embodiment, an apparatus for labeling crowd sourced data comprises: a non-transitory computer readable medium comprises program code, which when executed by a processor is configured to cause the processor to: measure the atmospheric pressure at a location associated with a venue; transmit a first signal to a remote location, the first signal associated with the measured atmospheric pressure; determine a signal measurement associated with a wireless network; transmit a second signal to a remote location, the second signal associated with the signal measurement;

receive a data signal from the remote location, the data signal comprising information associated with the location.

In another embodiment, the pressure is measured by one or more of: a barometric pressure sensor, an altitude sensor, an absolute pressure sensor, or a relative pressure sensor.

In another embodiment, the signal measurement comprises one or more of a Received Signal Strength Indicator (RSSI) or Round Trip Time (RTT) measurement.

In another embodiment, the venue comprises a building with a plurality of floors.

In another embodiment, the apparatus further comprises program code, which when executed, is configured to cause the processor to receive information associated with a feature of one or more of the plurality of floors.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
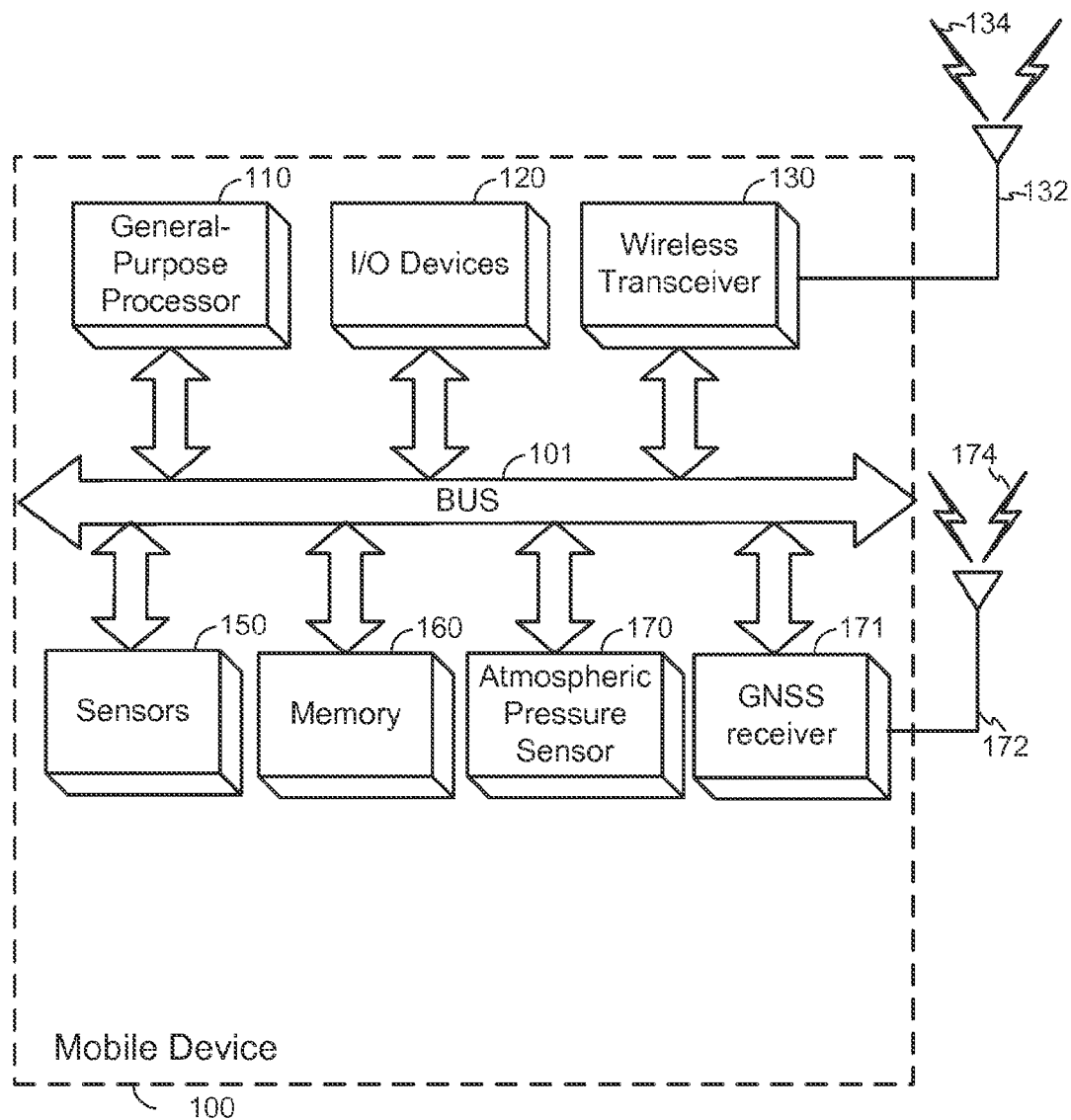
FIG. 1 illustrates a simplified diagram of a system that may incorporate one or more embodiments of the present disclosure.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The present disclosure relates to systems and methods for automated labeling of crowd sourced data. In some embodiments, this data may comprise location context identifier data (LCI-D). In some embodiments, LCI-D may mean data associated with prior visits to specific locations. In some embodiments, LCI-D may represent, for example, a specific venue, such as a building or structure, an entire floor of a particular building, or various wings of a building. Further, in some embodiments, some venues may have a single LCI indexing a single floor plan while other venues have multiple LCIs each corresponding to a different logical part the building. Furthermore, in some embodiments, LCI-D may be associated with training classifiers (e.g., supervised learning), or other algorithms associated with the previously collected and labeled data. For example, these algorithms may optimize parameters within the algorithm for a specific location and LCI-D One illustrative embodiment comprises a computer system configured to receive data associated with a specific location, e.g., atmospheric pressure data (e.g., atmospheric pressure data from a barometer or air pressure sensor), temperature data (e.g., from a thermometer or other temperature sensor), humidity data (e.g., from a humidity sensor), magnetic field data, sound data, light data, color data, or some other type of data from one or more mobile devices at venue, such as a multi-floor building. In the illustrative embodiment, once the computer system receives the data from a plurality of devices, the computer system forms groups or "clusters" of similar data values received from the plurality of mobile devices.

In the illustrative embodiment, once the number of clusters of data matches the number of floors in the venue, the computer system applies a label to each of the clusters. In some embodiments, the label is associated with the floor of the building. For example, in the illustrative embodiment, each of the clusters may comprise a different atmospheric pressure and the higher the pressure of the cluster, the lower the floor in the building. In other embodiments, the data may be associated with another type of location, e.g., outside of a building, or inside a specific building, a corridor within a building, a type of building (e.g., parking garage, hospital, office building, hotel).

Thus, in the illustrative embodiment, a ten floor building may comprise ten mobile devices on each floor. Thus, a server may receive signals comprising atmospheric pressure data from the mobile devices. Further, in the illustrative embodiment, the server may determine ten clusters of mobile devices with similar pressure values, for example, each of the clusters may comprise a plurality of atmospheric pressure values within a narrow range (e.g., 10 Pascals). For example, in some embodiments each additional floor may result in a 43 Pascal change in barometric pressure, depending on the height of each floor in the building. Further, each of the ten clusters may be associated with one of the floors in the building. Thus, each of the clusters may comprise a pressure value that increases the lower (e.g., the closer to the ground level) the cluster is located in the building.

In the illustrative embodiment, once the server determines that there are a certain number of clusters, the server will send an instruction to each of the plurality of mobile devices to perform a measurement associated with a signal (e.g., the cellular, voice, or data signal received by the device). In some embodiments, this signal measurement may comprise a measurement associated with a Received Signal Strength Indicator (RSSI) or Round Trip Time (RTT) measurement. In some embodiments, the mobile devices also transmit atmospheric pressure measurements at this time. Alternatively, in some embodiments, the signal measurements may be taken at the same time as the pressure measurements discussed above.

The server may then receive this data, and associate each of the signal measurements with a cluster of atmospheric pressure data. The server may further apply a label to the plurality of signal measurements. For example, the server may apply a label associated with the floor level of each cluster (e.g., a label that identifies the level of the building at which the cluster is located).

In some embodiments, the absolute elevation or floor of one or more of the clusters may be known in advance. For example, in one embodiment, one or more locations (e.g., floors) in a venue may comprise a fixed atmospheric pressure sensor that transmits pressure measurements to the server. In some embodiments, the fixed atmospheric pressure sensor may send pressure measurements to the server by transmitting measurements to one or more of the mobile devices discussed above, which then transmit the pressure measurement to the server. In still other embodiments, one or more users may enter data associated with the current floor the user is located on (e.g., by entering responses in a dialog box, web page, or mobile application). This data may then be transmitted to the server by the mobile device. Thus, in some embodiments, the server may not wait for data corresponding to every floor in the building. Instead, the server may directly label clusters that correspond to the known elevation. The server may further label data corresponding to the clusters adjacent to the known floor. Thus, for this set of floors the server may send a request to measure signal data (e.g., a Received Signal Strength Indicator (RSSI) or Round Trip Time (RTT) measurement) without waiting for the number of clusters to correspond to the number of floors in the building.

Based on the plurality of signal measurements associated with the plurality of clusters, the server may associate signal strengths with each of the floors of the building. The server may use this to further determine the floor of the building on which various mobile devices (and therefore the user of the device) is located based on signal information associated with that mobile device.

In some embodiments, if the server was unable to take a measurement for one or more floors in the venue, the server may extrapolate signal measurements based on the known signal strength for floors adjacent to the missing floors. For example, the server may have access to a database of data associated with a building that shows the approximate difference in pressure between each floor in the building. Thus, based on this data, the server may be able to determine that it will be missing signal data for only one floor (e.g., the third floor). Thus, the server may proceed with measurements from the available clusters, and may later attempt to collect data from the missing floor. Alternatively, the server may determine data associated with the missing floor by performing calculations on the available data to extrapolate the missing data.

Further, in some embodiments, the data may then be provided to other sources, e.g., mobile devices, application developers, mobile device manufacturers, network providers, or other groups. For example, in some embodiments the data may be stored in a database. Based on the information stored in this database, a mobile device or a server may be able to determine a user's location in a building (e.g., what floor the user is on) based only on signal measurement data. In some embodiments, this mobile device may comprise a mobile device that does not have an atmospheric pressure sensor. For example, in one embodiment, a user may be in a large building and wish to determine his or her location in the building. A mapping application on the user's mobile device may make a measurement of the currently received signals from an access network (e.g., a measurement of RSSI or RTT). The mapping application may then compare this data to a database of signal data determined as described above. Based on this comparison, the mapping application may be able to determine that the user is on a certain floor (e.g., the fourth floor) based only on the signal measurement.

In some embodiments, the database of data determined as described above may be transmitted to the mobile device by the server. Alternatively, in some embodiments, the server may transmit a set of parameters that the server may have obtained using the methods described above, to the mobile device. The mobile device may use this data in conjunction with RSSI and/or RTT measurements to determine information about the user's current location. For example, in some embodiments, the mobile device may use RSSI and/or RTT measurements to determine the user's current floor in a building.

In some embodiments, the data described above may be used to provide users with a finer level of granularity for mapping. Similarly, targeted marketing applications may use the user's floor level to send specific marketing information (e.g., marketing information associated with fitness when the user is on a gym level of a building or marketing information associated with food when the user is on a cafeteria level of a building). Further, in some embodiments, once the floor is determined, additional resources for that specific floor can be downloaded (e.g., assistance data), to run more precise localization algorithms.

Turning now to the Figures, FIG. 1 is a diagram illustrating a system for labeling crowd sourced data, consistent with some embodiments. FIG. 1 shows a mobile device 100. In some embodiments, mobile device 100 may comprise a smartphone such as an iPhone™ or other mobile device running the iOS™ operating system, the Android™ operating system, a BlackBerry™ operating system, the Microsoft® Windows® Phone operating system, Symbian™ OS, or webOS™. Alternatively, mobile device 100 may be a tablet computer, such as an iPad™ or other tablet computer running one of the aforementioned operating systems. Further, in some embodiments, mobile device 100 may be a PC, laptop, or netbook. In some embodiments, computing device 100 is a device that is either with a user most of the time or near a user most of the time.

According to some embodiments, mobile device 100 may be implemented using any appropriate combination of hardware and/or software configured for labeling crowd sourced data. In particular, mobile device 100 may include any appropriate combination of hardware and/or software having one or more processors and capable of reading instructions stored on a non-transitory machine-readable medium for execution by the one or more processors for, labeling crowd sourced data.

System bus 101 interconnects various components within mobile device 100 and communicates information between the various components. Such components include a general purpose processor 110, which may be one or more processors, for example, on or more of a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Consistent with some embodiments, mobile device 100 may also include input/output (I/O) device(s) 120 (e.g., a display, speaker, keypad, touch screen or touchpad, etc.). In some embodiments, I/O Devices 120 may comprise a display for displaying information to a user. In such an embodiment, the display may be a liquid crystal display (LCD)

screen, an organic light emitting diode (OLED) screen (including active matrix AMOLED screens), an LED screen, a plasma display, or a cathode ray tube (CRT) display. I/O Devices 120 may be integrated with mobile device 100, or may be separate from mobile device 100.

Mobile device 100 may include a wireless transceiver 130 configured to use an antenna 132 to transmit and receive wireless network signals 134. In some embodiments, wireless transceiver 130 and antenna 132 may be capable of transmitting and receiving information according to a different wireless networking protocol, such as Wi-Fi™, 3G, 4G, HDSPA, LTE, RF, NFC, Bluetooth™, and Zigbee™.

Mobile device 100 may also include one or more sensors 150 that capture data associated with mobile device 100 and/or its surroundings. Sensors 150 may include, but are not limited to, microphones or audio sensors, cameras, light sensors, proximity sensors, pressure sensors, inertial sensors (e.g., accelerometers and/or gyroscopes), magnetometers, etc. Further, sensors 150 may comprise user interfaces such as a keyboard or key pad, whether physical or virtual, buttons, a mouse, a trackball, or other such device, or a capacitive sensor-based touch screen.

In some embodiments, sensors 150 may be used individually or in combinations, such as sensor arrays or any other combination. Sensors 150 may communicate with general purpose processor 110 through bus 101 in order to process data captured by sensors 150 consistent with instructions stored in memory 160 and to generate or otherwise obtain metadata associated with captured data. In some embodiments, wireless transceivers 130 may also be utilized as sensors, for example, to sense or detect wireless signals such as Wi-Fi signals from wireless access points, and to detect wireless communications, or lack thereof. For example, in some embodiments, the wireless transceivers may detect the strength of Wi-Fi signal (RSSI) and the round-trip time (RTT) of the Wi-Fi signal.

Mobile device 100 may comprise a Global Navigation Satellite System (GNSS) receiver 171 coupled to a GNSS antenna 172 configured to receive GNSS signals 174. Consistent with some embodiments, GNSS receiver 171 and GNSS antenna 172 may be configured to receive satellite positioning system (SPS) signals such as GPS GLONASS, Galileo, Beidou, or other SPS signals for determining a location of mobile device 100.

Further, in some embodiments, General Purpose Processor 110 may utilize some combination of signals from GNSS receiver 171 and Wireless Transceiver 130 to determine the location of mobile device 100 based on an internet protocol (IP) address of mobile device 100 when mobile device 100 is in communication with a network or wireless access point.

Mobile device 100 may also include a Memory 160, which may comprise one or more forms of machine-readable media including, for example, floppy disk, flexible disk, hard disk, magnetic tape, any other magnetic medium, CD-ROM, any other optical medium, punch cards, paper tape, any other physical medium with patterns of holes, RAM, ROM, PROM, EPROM, FLASH-EPROM, any other memory chip or cartridge, and/or any other medium from which one or more processors or computer is adapted to read. In some embodiments, the memory 160 stores software, which is computer-readable, computer-executable software code containing instructions that are configured to, when executed, cause the general purpose processor 110 to perform various functions described herein. Alternatively, the software may not be directly executable by general purpose processor 110, but is configured, when compiled and executed to cause general purpose processor 110, to perform the functions.

Mobile device 100 may also include an atmospheric pressure sensor 170. Atmospheric pressure sensor 170 may comprise a sensor configured to detect the current atmospheric or air pressure (e.g., the barometric pressure), such as a barometric pressure sensor, an altitude sensor, an absolute pressure sensor, or a relative pressure sensor. Atmospheric pressure sensor 170 may comprise any sensor configured to measure the current atmospheric pressure at the location of mobile device 100. For example, atmospheric pressure sensor 170 may comprise an electronic barometric pressure sensor configured to measure the current barometric pressure and provide a digital or analog signal associated with the measured pressure to general purpose processor 110 via bus 101. Similarly, atmospheric pressure sensor 170 may comprise a sensor comprising, for example piezoelectric sensors, diaphragms, and other components configured to measure the current atmospheric pressure. Further, in some embodiments, atmospheric pressure sensor 170 may be configured to use wireless transceiver 130 to connect to an external atmospheric pressure sensor, or database of atmospheric pressure data.

Although the components of mobile device 100 are shown as being integrated into mobile device 100 the components are not so limited and may be separate from and external to mobile device 100, and coupled to mobile device 100 and bus 101 via a wired or wireless coupling.

As discussed above, many mobile devices now incorporate one or more atmospheric pressure sensors capable of measuring the current atmospheric pressure. Some mobile devices may use this pressure data to determine the mobile device's approximate altitude (e.g., the higher the pressure, the lower in elevation the device is). However, not every mobile device comprises an atmospheric pressure sensor. Further, pressure may vary throughout a venue (e.g., due to the operation of the climate control system). Thus, embodiments of the present disclosure provide systems and methods that rely on a plurality of measurements made by a plurality of devices to develop LCI-D associated with a venue.

Figure 2:
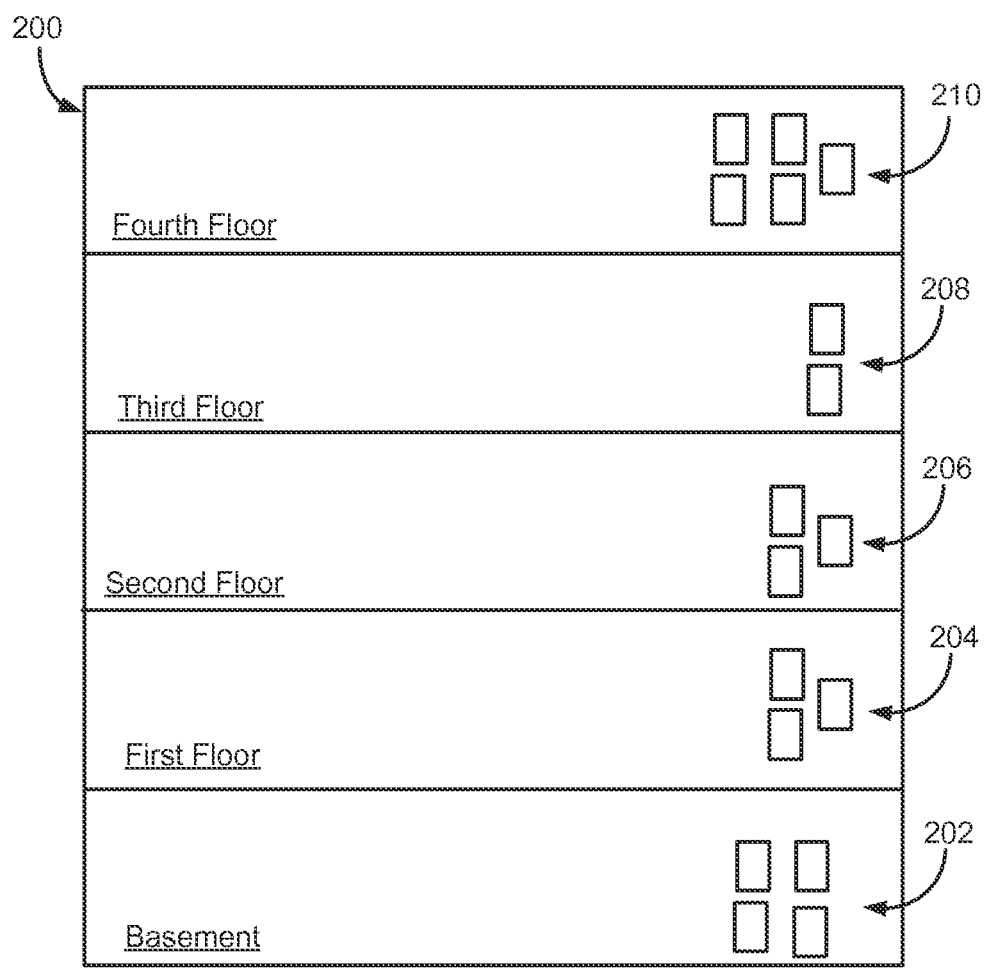
FIG. 2 illustrates a diagram of a system that may incorporate one or more embodiments of the present disclosure.

Turning now to FIG. 2, FIG. 2 illustrates a diagram showing a plurality of mobile devices on various floors of a building according to one embodiment. As shown in FIG. 2, system 200 shows a building with four floors and a basement. As shown in FIG. 2, each of the four floors and the basement further comprise a plurality of mobile devices, 202, 204, 206, 208, and 210. Each of the mobile devices may comprise a device similar to mobile device 100, described above with regard to FIG. 1. Thus, each mobile device may comprise an atmospheric pressure sensor configured to measure the atmospheric pressure on its respective floor. Further, each mobile device may transmit a signal associated with this measured pressure to a central server.

Figure 3A:
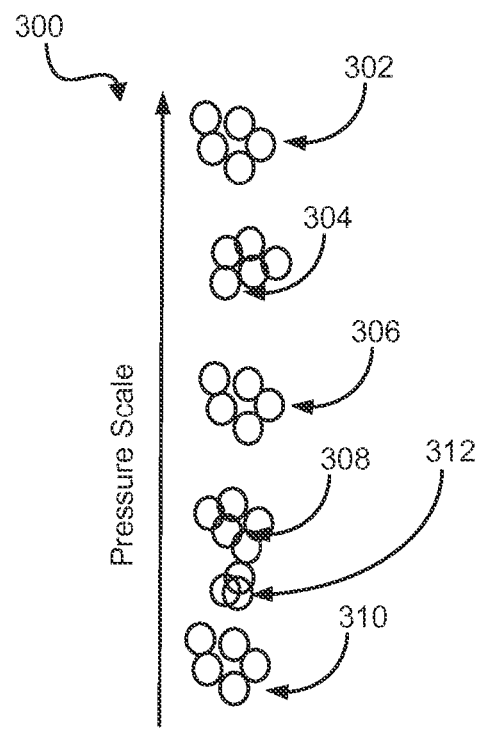
FIG. 3A illustrates a diagram of a system that may incorporate one or more embodiments of the present disclosure.

Turning now to FIG. 3A, FIG. 3A shows a graph 300 of the measured pressure for each of the plurality mobile devices shown in FIG. 2. As shown in FIG. 3A, the measured pressure appears as five clusters of varying pressure. As shown, cluster 302 has the highest pressure, cluster 304 has a lower pressure, and clusters 306, 308, and 310 have still lower pressures. Under ordinary circumstances, atmospheric pressure will decrease as elevation increases. Thus in the embodiment shown in FIG. 2, cluster 302 may comprise the lowest elevation of the five clusters. Further, in such an embodiment, cluster 310 may comprise the highest elevation of the five clusters.

Further, FIG. 3A comprises a outliers 312, which do not fit in any of the five clusters. As shown in FIG. 3A, outliers 312 comprise a pressure between that of clusters 308 and 310. In some embodiments, outliers 312 may be associated with an inaccurate reading. For example, in some embodiments, one of outliers 312 may be associated with a malfunctioning mobile device or atmospheric pressure sensor. Further, in some embodiments, one of outliers 312 may be associated with a mobile device that is in an area with artificially varying pressure. For example, one of outliers 312 may be associated with a mobile device that is located very close to a ventilation duct or vent, and thus its atmospheric pressure sensor may determine an improperly varying pressure. Similarly, in one embodiment, one of outliers 312 may be associated with a mobile device that is placed close to an open or leaking window. In some embodiments, a central server in communication with each of the mobile devices may ignore outliers 312 in order to prevent inaccurate measurements.

As mentioned above, under ordinary circumstances, atmospheric pressure will decrease with elevation (e.g., the pressure on the top floor of a building is lower than the pressure on the bottom floor). Furthermore, if a server in communication with each mobile device in the plurality of clusters knows the number of floors in a building, such a server may be able to determine that when the number of clusters of atmospheric pressure measurements corresponds to the number of floors there is a cluster of mobile devices on each floor.

In some embodiments, the absolute elevation or floor of one or more of the clusters may be known in advance. For example, in one embodiment, one or more locations (e.g., floors) in a venue may comprise a fixed atmospheric pressure sensor that transmits pressure measurements to the server. In some embodiments, the fixed atmospheric pressure sensor may send pressure measurements to the server by transmitting measurements to one or more of the mobile devices discussed above, which then transmit the pressure measurement to the server. In still other embodiments, one or more users may enter data associated with the current floor on which the user is located (e.g., by entering responses in a dialog box, web page, or mobile application). This data may then be transmitted to the server by the mobile device. Thus, in some embodiments, the server may not wait for data corresponding to every floor in the building. Instead, the server may directly label clusters that correspond to the known elevation. The server may further label data corresponding to the clusters adjacent to the known floor. Thus, for this set of floors the server may send a request to measure signal data (e.g., a Received Signal Strength Indicator (RSSI) or Round Trip Time (RTT) measurement) without waiting for the number of clusters to correspond to the number of floors in the building.

Figure 3B:
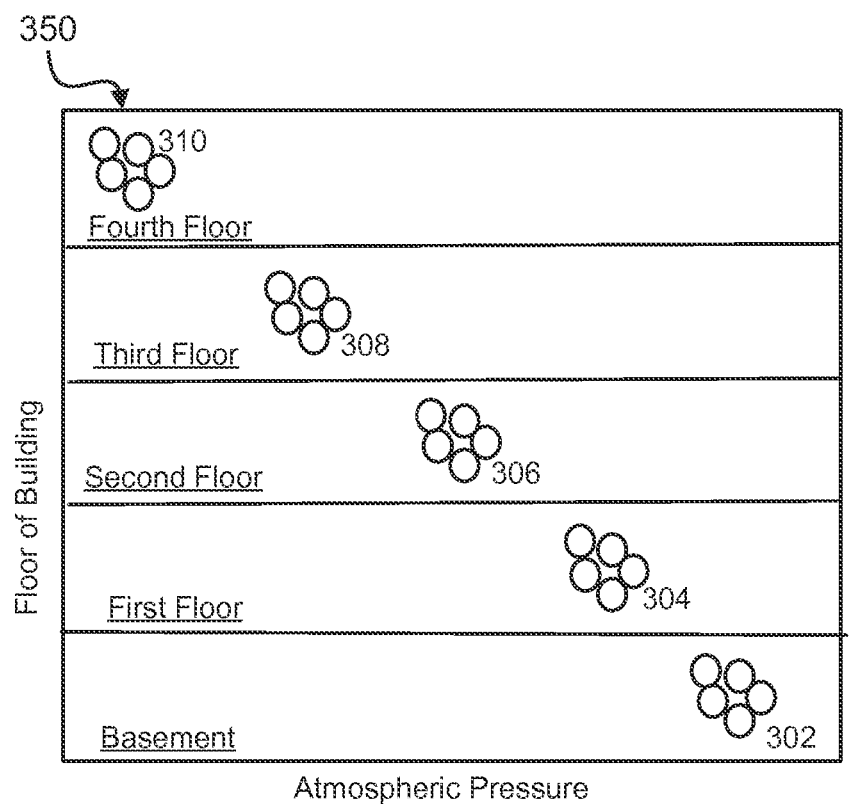
FIG. 3B illustrates a diagram of a system that may incorporate one or more embodiments of the present disclosure.

Turning to FIG. 3B, FIG. 3B shows chart 350, which shows each of clusters 310, 308, 306, 304, and 302. As shown in FIG. 3B, the further to the right each cluster is, the higher the measured atmospheric pressure. Similarly, as shown in FIG. 3B, the closer to the top of graph 350, the higher the elevation of the cluster. As shown in FIG. 3B, a device in communication with each cluster of mobile devices may be able to place each cluster in its respective floor of a building. For example, a system may determine that because there are five clusters of pressure measurements in a building with four floors and a basement, that the highest pressure measurement is in the basement, the next highest is the first floor, the next highest is the second floor, etc., until each cluster has been assigned a floor.

Further, in some embodiments, the server may assign each cluster a label. In some embodiments, this label may be associated with the floor on which each cluster resides. For example, as shown in FIG. 3B, cluster 310 may be assigned a label "Fourth Floor" or some other label (e.g., a digital label such as a binary or hexadecimal label) associated with that floor or location in the building.

In some embodiments, a server may not assign a label to each floor of the building. For example, in some embodiments, a server may only assign a label to a certain segment of floors. For example, in one embodiment a multi-floor building may comprise an increment of floors between two fixed atmospheric pressure sensors. For example, according to such an embodiment, a 100 floor building may comprise an atmospheric pressure sensor on every tenth floor. In such an embodiment, rather than applying a label to each floor in the building, the server may divide the building into segments, e.g., the floors between the tenth floor, which has a known pressure and the twentieth floor, which has a known pressure. This may conserve resources, or enable the server to complete other operations while at least a certain number of mobile devices remain in the same location as when first measured (e.g., so that each cluster is still intact).

Figure 4:
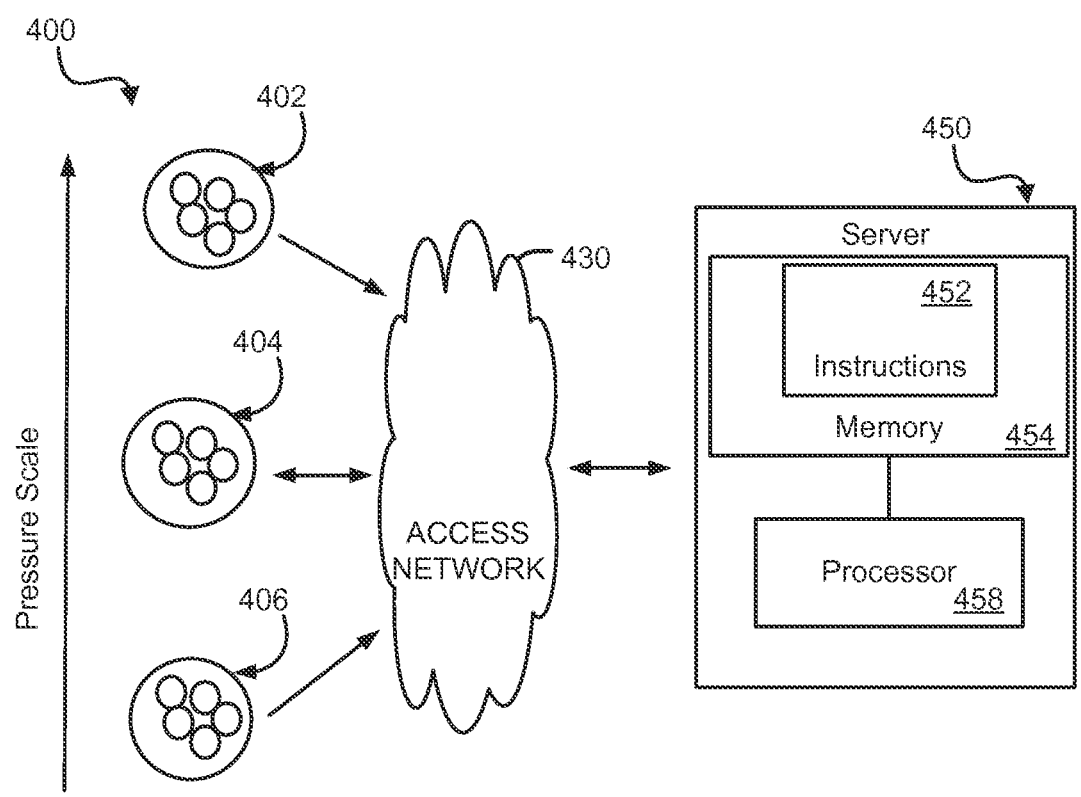
FIG. 4 illustrates a diagram of a system that may incorporate one or more embodiments of the present disclosure.

Turning now to FIG. 4, FIG. 4 shows another embodiment 400 according to the present disclosure. As shown in FIG. 4, three clusters of mobile devices that have measured varying pressure 402, 404, and 406 are shown. As described above, each of clusters 402, 404, and 406 may be associated with a different floor of a multistory building.

Further, each mobile device in clusters 402, 404, and 406 may be in communication with an access network 430. Access network 430 may comprise a wireless network such as wireless networking protocol, such as Wi-Fi™, 3G, 4G, HDSPA, LTE, RF, NFC, Bluetooth™, and Zigbee™. Further, access network 430 may comprise additional wired and/or wireless network components coupling access network to server 450.

As shown in FIG. 4, server 450 comprises a memory 454 coupled to a processor 458. The memory 454 may store instructions 452 executable by the processor 458, where the instructions represent various logical modules, components, and applications. For example, the memory 454 may store computer-executable software code containing instructions that are configured to, when executed, cause the processor 458 to perform various functions described herein.

As shown in FIG. 4, once the server 450 determines that there are a predetermined number of clusters (e.g., three clusters in the embodiment shown in FIG. 4), the server 450 sends a command via access network 430 to one or more of the plurality of mobile devices in the plurality of clusters. In some embodiments, the command is sent to all of the plurality of mobile devices in the plurality of clusters. In some embodiments, one or more of the plurality of mobile devices may have moved (e.g., its user may have left the building), thus not every one of the plurality of mobile devices in the plurality of clusters may receive the command signal. In some embodiments, the command signal may comprise a command to perform a signal measurement. In some embodiments, this signal measurement may comprise a measurement associated with a Received Signal Strength Indicator (RSSI) or Round Trip Time (RTT) measurement. Further, in some embodiments, the command signal may comprise a command to perform another measurement of the current atmospheric pressure. Once the mobile device makes these measurements, it may then transmit a signal comprising the measurement data to server 450.

The server 450 may receive the signal comprising the measurement data from the mobile device. The server 450 may associate each of the signal measurements with the cluster of the mobile device at which the measurement was made. In some embodiments, if the number of clusters is less than the number of floors, the server 450 may determine that there is insufficient data to proceed. Thus, the server may determine to wait for a period of time until the number of cluster become equal to the number of floors. For example, in some embodiments, the server 450 may wait for a fixed period of time (e.g., 5 minutes, 10 minutes, or 30 minutes). Alternatively, the server 450 may continue to communicate with the plurality of mobile devices until the number of clusters matches the number of floors.

In some embodiments, the absolute elevation or floor of one or more of the clusters may be known in advance. For example, in one embodiment, one or more locations (e.g., floors) in a venue may comprise a fixed atmospheric pressure sensor that transmits pressure measurements to the server 450. In some embodiments, the fixed atmospheric pressure sensor may send pressure measurements to the server 450 by transmitting measurements to one or more of the mobile devices discussed above, which then transmit the pressure measurement to the server 450. In still other embodiments, one or more users may enter data associated with the current floor the user is located on (e.g., by entering responses in a dialog box, web page, or mobile application). This data may then be transmitted to the server by the mobile device. Thus, in some embodiments, the server may not wait for data corresponding to every floor in the building. Instead, the server 450 may directly label clusters that correspond to the known elevation. The server may further label data corresponding to the clusters adjacent to the known floor. Thus, for this set of floors the server may send a request to measure signal data (e.g., a Received Signal Strength Indicator (RSSI) or Round Trip Time (RTT) measurement) without waiting for the number of clusters to correspond to the number of floors in the building.

In some embodiments, the server 450 may have access to a data store that comprises pressure gap or pressure differential information, which enables the server 450 to determine that there is a difference in pressure measurements associated with one or more floors between the clusters. For example, the server 450 may have access to a database of data associated with a building that shows the approximate difference in pressure between each floor in the building. Thus, based on this data, the server 450 may be able to determine that it is missing pressure data for one or more of the floors (e.g., the third floor), and therefore determine that it will be missing signal data for that floor (e.g., the third floor). In some embodiments, the server 450 may proceed with measurements from the available clusters, and may later attempt to collect data from the missing floor. Alternatively, the server 450 may determine data associated with the missing floor by performing calculations on the available data to extrapolate the missing data.

In some embodiments, the server may not receive a signal measurement from each device in a cluster. For example, in some embodiments, a user may have traveled to a different location, and thus his or her mobile device may not send a signal. In some embodiments, the server 450 is configured to compare the number of received signal measurements, and compare this to the expected number (e.g., the number of devices in the cluster). In some embodiments, if the number varies beyond a threshold, the data may be discarded, and a new signal measurement may be taken. Further, in some embodiments, the signal data may be averaged or outliers may be removed from the signal data to ensure more accurate measurements.

In some embodiments, the server 450 may further apply a label to the plurality of signal measurements. Similarly, in some embodiments, the server 450 may apply a label to a range or average determined from the plurality of signal measurements. In some embodiments, this label may correspond to the floor of the building. Thus, in some embodiments, the server 450 may associate the measurement data with the each floor in the building. This data may then be associated with a database of data associated with the building or a plurality of buildings.

Based on the information stored in this database, a mobile device or a server may be able to determine a user's location in a building (e.g., what floor the user is on) based only on signal measurement data. In some embodiments, this mobile device may comprise a mobile device that does not have an atmospheric pressure sensor. For example, in one embodiment, a user may be in a large building and wish to determine his or her location in the building. A mapping application on the user's mobile device may make a measurement of the currently received signals from an access network (e.g., a measurement of RSSI or RTT). The mapping application may then compare this data to a database of data determined as described above with regard to FIG. 1-FIG. 4. Based on this comparison, the mapping application may be able to determine that the user is on a certain floor (e.g., the fourth floor) based only on the signal measurement.

In some embodiments, the database of data determined as described above may be transmitted to the mobile device by the server. Alternatively, in some embodiments, the server may transmit a set of parameters that the server may have obtained using the methods described above, to the mobile device. The mobile device may use this data in conjunction with RSSI and/or RTT measurements to determine information about the user's current location. For example, in some embodiments, the mobile device may use RSSI and/or RTT measurements to determine the user's current floor in a building.

Figure 5:
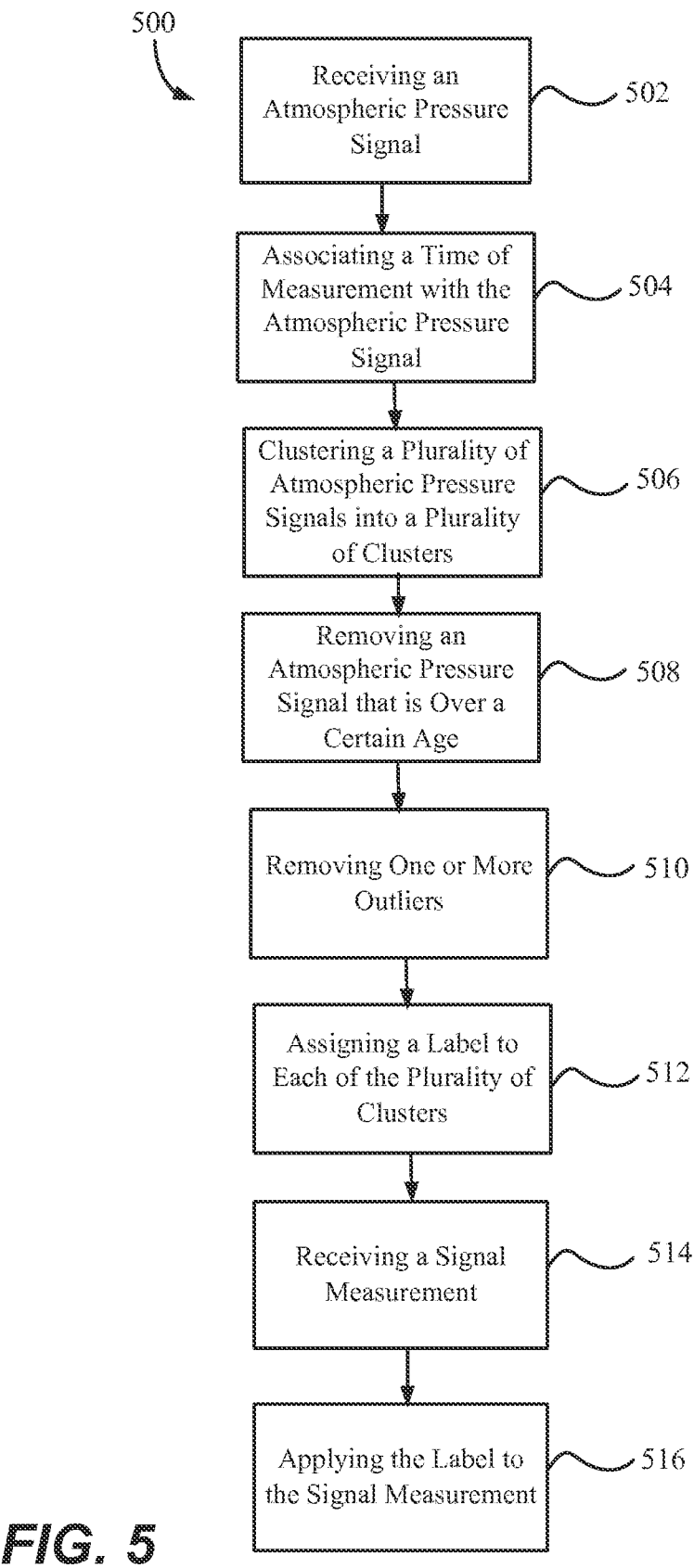
FIG. 5 illustrates a flow chart of a method for performing labeling of crowd sourced data according to one or more embodiments.

Turning now to FIG. 5, FIG. 5 is a flow chart of the stages of a method for automated labeling of crowd sourced data. In some embodiments, the stages in FIG. 5 may be implemented in program code that is executed by a processor, for example, the processor in a general purpose computer or server. In some embodiments, these stages may be implemented by a group of processors. In some embodiments, not every stage shown in FIG. 5 may be executed. Similarly, in some embodiments, the stages shown in FIG. 5 may be executed in a different order. The stages shown in FIG. 5 are described with regard to the components of system 100 shown in FIG. 1.

As shown in FIG. 5, the method 500 begins at stage 502 when an atmospheric pressure signal is received. In some embodiments, the atmospheric pressure signal may be received from an atmospheric pressure sensor 170. Further, in some embodiments, the atmospheric pressure signal may be transmitted to a server (e.g., server 450 described with regard to FIG. 4) via wireless transceiver 130, antenna 132, and a wireless network. In alternate embodiments, the atmospheric pressure signal may be transmitted via a wired network. In some embodiments, the atmospheric pressure signal may be associated with the current atmospheric pressure measured by atmospheric pressure sensor 170.

Next, at stage 504, a processor associates a time of measurement associated with the atmospheric pressure signal. In some embodiments, the time of measurement may comprise an approximation of the time the atmospheric pressure measurement was made by atmospheric pressure sensor 170.

The method continues to stage 506 when a plurality of atmospheric pressure signals is clustered into a plurality of clusters. In some embodiments, each of the plurality of atmospheric pressure signals may comprise atmospheric pressure signals received from different mobile devices (e.g., mobile devices similar to system 100 described above with regard to FIG. 1). Further, each of the plurality of clusters may comprise pressure signals that are within a certain range of each other. For example, each cluster may comprise pressures that are within a variance associated with a four meter change in elevation. In such an embodiment, for example, all pressures that are within the range of zero meters above sea level and four meters above sea level may comprise a cluster. Further, in such an embodiment, all pressures that are within the range of four meters above sea level and eight meters above sea level may comprise another cluster. In other embodiments, different ranges may be used to determine each of the clusters, and ranges may overlap.

Next, at stage 508, signals that are over a certain age are removed. For example, in some embodiments, signals that were measured more than a certain time period in the past may be discarded. This may prevent inaccurate measurements, and reduce the likelihood that measurements are taken from devices that are no longer present in the building. For example, in one embodiment, all pressure measurements that are more than ten minutes old may be discarded. In other embodiments, a longer or shorter period of time may be used.

Then, at stage 510, one or more outliers are removed. In some embodiments, outliers may comprise measurements that do not fit within one or more clusters, for example, because they are outside the range of all the clusters. Alternatively, an outlier may be within the range of the cluster, but there may be larger group of measurements that are within a closer range than the outlier. In some embodiments, outliers may be associated with a malfunctioning atmospheric pressure sensor 170. Further, in some embodiments, outliers may be associated with external influences on the measured pressure. For example, in some embodiments, outliers may be associated with mobile devices that are close to a ventilation duct or vent, an open window, an elevator, a sealed space (e.g., a gym bag), or associated with a user that is in the elevator or stairway going between floors, or some other external influence that may impact pressure measurement.

Next, at stage 512, a label is assigned to each of the plurality of clusters. In some embodiments, stage 512 occurs once a server determines that the number of clusters corresponds to a known number of floors in a building, or another predetermined range within the building. In some embodiments, the label is associated with the floor of the building. For example, in one embodiment, each of the clusters may comprise a different pressure and the higher the pressure of the cluster, the lower the floor in the building. Thus, in such an embodiment, the highest pressure cluster may be assigned the lowest floor (e.g., ground floor, first floor, basement, etc.). Further, in such an embodiment, the next highest pressure cluster may be assigned a label associated with the next lowest floor, and so on.

Then, at stage 514, a signal measurement is received. In some embodiments, stage 514 occurs after a server determines that there are a certain number of clusters. At this time, the server may send an instruction to each of the plurality of mobile devices to perform a measurement associated with a signal (e.g., the cellular voice or data signal received by the device). In some embodiments, the signal strength measurements may be taken at the same time as the measurement of atmospheric pressure discussed above with regard to stage 502. In some embodiments, this signal measurement may comprise a measurement associated with a Received Signal Strength Indicator (RSSI) or Round Trip Time (RTT) measurement. The server may then receive this data, and associate each of the signal measurements with the cluster of the mobile device at which the measurement was made.

Then at stage 516, the label is applied to the signal measurement. In some embodiments, this label may comprise a label associated with the floor on which the mobile device is located. Further, in some embodiments, this label and the associated signaling data may be sent to a database of data that is accessible to application developers or applications running on mobile devices. In some embodiments, this data may be used to develop more granular map data, e.g., to allow users to determine their location within a specific building. Similarly, in some embodiments, applications may use this data to direct specific information to the user. For example, in some embodiments, applications may direct data that is associated with the floor on which the user is located. In some embodiments, this may comprise, for example, map data, marketing data, data about a specific room or service located in a room, or some other type of data.

Figure 6:
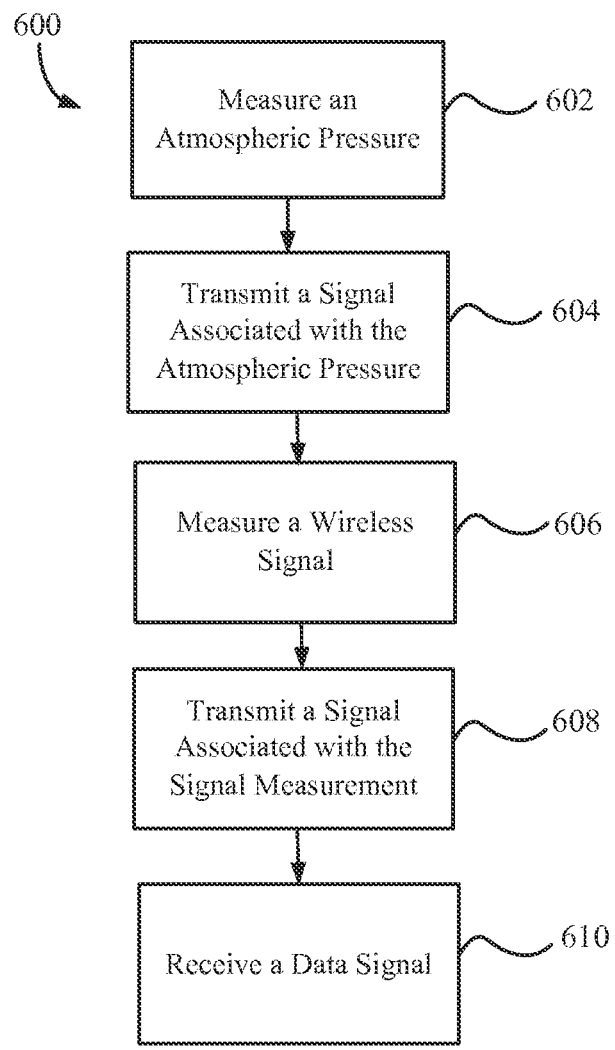
FIG. 6 illustrates a flow chart of a method for performing labeling of crowd sourced data according to one or more embodiments.

Turning now to FIG. 6, FIG. 6 is a flow chart of the stages of a method for automated labeling of crowd sourced data. In some embodiments, the stages in FIG. 6 may be implemented in program code that is executed by a processor, for example, the processor in a general purpose computer or server. In some embodiments, these stages may be implemented by a group of processors. In some embodiments, not every stage shown in FIG. 6 may be executed. Similarly, in some embodiments, the stages shown in FIG. 6 may be executed in a different order. The stages shown in FIG. 6 are described with regard to the components of system 100 shown in FIG. 1.

As shown in FIG. 6, the method 600 begins at stage 602 when the atmospheric pressure is measured. In some embodiments, the atmospheric pressure signal may be received from an atmospheric pressure sensor 170. As discussed above, Atmospheric pressure sensor 170 may comprise any sensor configured to measure the current atmospheric pressure at the location of mobile device 100.

The method 600 continues to stage 604 when a signal associated with the atmospheric pressure is transmitted. In some embodiments, the atmospheric pressure signal may be transmitted to a server (e.g., server 450 described with regard to FIG. 4) via wireless transceiver 130, antenna 132, and a wireless network. In alternate embodiments, the signal may be transmitted via a wired network. In some embodiments, the atmospheric pressure signal may be associated with the current atmospheric pressure measured by atmospheric pressure sensor 170.

The method 600 continues to stage 606 when a signal measurement is determined. In some embodiments, the signal measurement may comprise a measurement associated with a cellular voice or data signal received by the mobile device 100. In some embodiments, the signal strength measurements may be taken at the same time as the measurement of atmospheric pressure discussed above with regard to stage 602. In some embodiments, this signal measurement may comprise a measurement associated with a Received Signal Strength Indicator (RSSI) or Round Trip Time (RTT) measurement.

The method 600 continues to stage 608 when the mobile device 100 transmits a signal associated with the signal measurement. In some embodiments, mobile device 100 may transmit the signal to a server, for example, server 450 described above with regard to FIG. 4. In some embodiments, the server 450 may then receive this data, and associate each of the signal measurements with the cluster of the mobile device at which the measurement was made.

The method 600 continues to stage 610 when the mobile device 100 receives a data signal. In some embodiments, the data signal may comprise data associated with a database of data determined as described above with regard to FIG. 5. Further, in some embodiments, the server 450 may transmit a set of parameters that the server 450 may have obtained using the methods described above. The mobile device 100 may use this data in conjunction with RSSI and/or RTT measurements to determine information about the user's current location. For example, in some embodiments, the mobile device 100 may use RSSI and/or RTT measurements to determine the user's current floor in a building.

In some embodiments, the data described above may be used to provide users with a finer level of granularity for mapping. Similarly, targeted marketing applications may use the user's floor level to send specific marketing information (e.g., marketing information associated with fitness when the user is on a gym level of a building or marketing information associated with food when the user is on a cafeteria level of a building). Further, in some embodiments, once the floor is determined, additional resources for that specific floor can be downloaded (e.g., assistance data), to run more precise localization algorithms.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method for labeling crowd sourced data, the method comprising:
   receiving an atmospheric pressure signal from a first mobile device associated with a venue;
   clustering a plurality of atmospheric pressure signals from a plurality of second mobile devices associated with the venue into a plurality of clusters;
   assigning a label to each of the plurality of clusters, the label associated with elevation in the venue;
   receiving first signal measurements from one or more of the plurality of second mobile devices;
   applying the label to the first signal measurements; and
   storing the first signal measurements to enable one or more third mobile devices to determine elevation based on second signal measurements.

2. The method of claim 1, wherein the atmospheric pressure signal is obtained from one or more of: a barometric pressure sensor, an altitude sensor, an absolute pressure sensor, or a relative pressure sensor.

3. The method of claim 1, wherein the first signal measurement comprises one or more of a Received Signal Strength Indicator (RSSI) or a Round Trip Time (RTT) measurement.

4. The method of claim 1, wherein the venue comprises a building with a plurality of floors.

5. The method of claim 4, wherein each of the plurality of clusters is associated with one of the plurality of floors.

6. The method of claim 5, wherein the label is associated with a floor of the building the mobile device is on.

7. The method of claim 1, further comprising: removing one or more outliers from the plurality of atmospheric pressure signals.

8. The method of claim 1, further comprising:
   associating a time of measurement with each of the plurality of atmospheric pressure signals; and
   removing one or more of the plurality of atmospheric pressure signals that are older than a certain length of time.

9. The method of claim 1, further comprising comparing one or more of the plurality of clusters to a known pressure value.

10. The method of claim 1, wherein each of the plurality of clusters comprises a plurality of atmospheric pressure signals of a similar value.

11. An apparatus for labeling crowd sourced data, the apparatus comprising:
    a processor configured to:
    receive an atmospheric pressure signal from a first mobile device associated with a venue;
    cluster a plurality of atmospheric pressure signals from a plurality of second mobile devices associated with the venue into a plurality of clusters;
    assign a label to each of the plurality of clusters, the label associated with elevation in the venue;
    receive first signal measurements from one or more of the plurality of second mobile devices;
    apply the label to the first signal measurement; and
    store the first signal measurements to enable one or more third mobile devices to determine elevation based on second signal measurements.

12. The apparatus of claim 11, wherein the atmospheric pressure signal is obtained from one or more of: a barometric pressure sensor, an altitude sensor, an absolute pressure sensor, or a relative pressure sensor.

13. The apparatus of claim 11, wherein the first signal measurement comprises one or more of a Received Signal Strength Indicator (RSSI) or a Round Trip Time (RTT) measurement.

14. The apparatus of claim 11, wherein the venue comprises a building with a plurality of floors.

15. The apparatus of claim 14, wherein each of the plurality of clusters is associated with one of the plurality of floors.

16. The apparatus of claim 15, wherein the label is associated with the floor of the building the mobile device is on.

17. The apparatus of claim 11, wherein the processor is further configured to: remove one or more outliers from the plurality of atmospheric pressure signals.

18. The apparatus of claim 11, wherein the processor is further configured to:
    associate a time of measurement with each of the plurality of atmospheric pressure signals; and
    remove one or more of the plurality of atmospheric pressure signals that are older than a certain length of time.

19. The apparatus of claim 11, wherein the processor is further configured to compare one or more of the plurality of clusters to a known pressure value.

20. The apparatus of claim 11, wherein each of the plurality of clusters comprises a plurality of atmospheric pressure signals of a similar value.

21. An apparatus for labeling crowd sourced data, the apparatus comprising:
    a means for receiving an atmospheric pressure signal from a first mobile device associated with a venue;
    a means for clustering a plurality of atmospheric pressure signals from a plurality of second mobile devices associated with the venue into a plurality of clusters;
    a means for assigning a label to each of the plurality of clusters, the label associated with elevation in the venue;
    a means for receiving first signal measurements from one or more of the plurality of second mobile devices;
    a means for applying the label to the first signal measurement; and
    a means for storing the first signal measurements to enable one or more third mobile devices to determine elevation based on second signal measurements.

22. The apparatus of claim 21, wherein the atmospheric pressure signal is obtained from one or more of: a barometric pressure sensor, an altitude sensor, an absolute pressure sensor, or a relative pressure sensor.

23. The apparatus of claim 21, wherein the first signal measurement comprises one or more of a Received Signal Strength Indicator (RSSI) or a Round Trip Time (RTT) measurement.

24. The apparatus of claim 21, wherein the venue comprises a building with a plurality of floors.

25. The apparatus of claim 24, wherein each of the plurality of clusters is associated with one of the plurality of floors.

26. The apparatus of claim 25, wherein the label is associated with the floor of the building the mobile device is on.

27. The apparatus of claim 21, further comprising: a means for removing one or more outliers from the plurality of atmospheric pressure signals.

28. The apparatus of claim 21, further comprising:
a means for associating a time of measurement with each of the plurality of atmospheric pressure signals; and
a means for removing one or more of the plurality of atmospheric pressure signals that are older than a certain length of time.

29. The apparatus of claim 21, further comprising a means for comparing one or more of the plurality of clusters to a known pressure value.

30. The apparatus of claim 21, wherein each of the plurality of clusters comprises a plurality of atmospheric pressure signals of a similar value.

31. A non-transitory computer readable medium comprising program code, which when executed by a processor is configured to cause the processor to:
receive an atmospheric pressure signal from a first mobile device associated with a venue;
cluster a plurality of atmospheric pressure signals from a plurality of second mobile devices associated with the venue into a plurality of clusters;
assign a label to each of the plurality of clusters, the label associated with elevation in the venue;
receive first signal measurements from one or more of the plurality of second mobile devices;
apply the label to the first signal measurement; and
store the first signal measurements to enable one or more third mobile devices to determine elevation based on second signal measurements.

32. The non-transitory computer readable medium of claim 31, wherein the atmospheric pressure signal is obtained from one or more of: a barometric pressure sensor, an altitude sensor, an absolute pressure sensor, or a relative pressure sensor.

33. The non-transitory computer readable medium of claim 31, wherein the first signal measurement comprises one or more of a Received Signal Strength Indicator (RSSI) or a Round Trip Time (RTT) measurement.

34. The non-transitory computer readable medium of claim 31, wherein the venue comprises a building with a plurality of floors.

35. The non-transitory computer readable medium of claim 34, wherein each of the plurality of clusters is associated with one of the plurality of floors.

36. The non-transitory computer readable medium of claim 35, wherein the label is associated with a floor of the building the mobile device is on.

37. The non-transitory computer readable medium of claim 31, further comprising program code, which when executed by the processor is configured to cause the processor to: remove one or more outliers from the plurality of atmospheric pressure signals.

38. The non-transitory computer readable medium of claim 31, further comprising program code, which when executed by the processor is configured to cause the processor to:
associate a time of measurement with each of the plurality of atmospheric pressure signals; and
remove one or more of the plurality of atmospheric pressure signals that are older than a certain length of time.

39. The non-transitory computer readable medium of claim 31, further comprising comparing one or more of the plurality of clusters to a known pressure value.

40. The non-transitory computer readable medium of claim 31, wherein each of the plurality of clusters comprises a plurality of atmospheric pressure signals of a similar value.

41. A method for labeling crowd sourced data, the method comprising:
measuring, by a first mobile device, an atmospheric pressure at a location associated with a venue;
transmitting a first signal to a remote location, the first signal associated with the measured atmospheric pressure;
determining a first signal measurement associated with a second mobile device and a wireless network;
transmitting a second signal to the remote location, the second signal associated with the first signal measurement;
receiving a data signal from the remote location, the data signal comprising information associated with the location, the information comprising an elevation; and
storing the first signal measurements to enable one or more third mobile devices to determine the elevation based on second signal measurements.

42. The method of claim 41, wherein the atmospheric pressure is measured by one or more of: a barometric pressure sensor, an altitude sensor, an absolute pressure sensor, or a relative pressure sensor.

43. The method of claim 41, wherein the first signal measurement comprises one or more of a Received Signal Strength Indicator (RSSI) or a Round Trip Time (RTT) measurement.

44. The method of claim 41, wherein the venue comprises a building with a plurality of floors.

45. The method of claim 44, further comprising receiving information associated with a feature of one or more of the plurality of floors.

46. An apparatus for labeling crowd sourced data, the apparatus comprising:
a sensor associated with a first mobile device, the sensor configured to measure an atmospheric pressure at a location associated with a venue;
a processor configured to:
transmit a first signal to a remote location, the first signal associated with the measured atmospheric pressure;
determine a first signal measurement associated with a second mobile device and a wireless network;
transmit a second signal to the remote location, the second signal associated with the first signal measurement;
receive a data signal from the remote location, the data signal comprising information associated with the location, the information comprising an elevation; and
store the first signal measurement to enable one or more third mobile devices to determine the elevation based on second signal measurements.

47. The apparatus of claim 46, wherein the sensor comprises one or more of: a barometric pressure sensor, an altitude sensor, an absolute pressure sensor, or a relative pressure sensor.

48. The apparatus of claim 46, wherein the first signal measurement comprises one or more of a Received Signal Strength Indicator (RSSI) or a Round Trip Time (RTT) measurement.

49. The apparatus of claim 46, wherein the venue comprises a building with a plurality of floors.

50. The apparatus of claim 49, wherein the processor is further configured to receive information associated with a feature of one or more of the plurality of floors.

51. An apparatus for labeling crowd sourced data, the apparatus comprising:
   a means for measuring, by a first mobile device, an atmospheric pressure at a location associated with a venue;
   a means for transmitting a first signal to a remote location, the first signal associated with the measured atmospheric pressure;
   a means for determining a first signal measurement associated with a second mobile device and a wireless network;
   a means for transmitting a second signal to the remote location, the second signal associated with the first signal measurement;
   a means for receiving a data signal from the remote location, the data signal comprising information associated with the location, the information comprising an elevation; and
   a means for storing the first signal measurements to enable one or more third mobile devices to determine the elevation based on second signal measurements.

52. The apparatus of claim 51, wherein the means for measuring the atmospheric pressure comprises one or more of: a means for measuring barometric pressure, a means for measuring altitude, a means for measuring absolute pressure, or a means for measuring relative pressure.

53. The apparatus of claim 51, wherein the means for determining a first signal measurement comprises one or more of a means for measuring Received Signal Strength Indicator (RSSI) or a means for measuring Round Trip Time (RTT) measurement.

54. The apparatus of claim 51, wherein the venue comprises a building with a plurality of floors.

55. The apparatus of claim 54, further comprising a means for receiving information associated with a feature of one or more of the plurality of floors.

56. A non-transitory computer readable medium comprising program code, which when executed by a processor is configured to cause the processor to:
   measure, by a first mobile device, an atmospheric pressure at a location associated with a venue;
   transmit a first signal to a remote location, the first signal associated with the measured atmospheric pressure;
   determine a first signal measurement associated with a second mobile device and a wireless network;
   transmit a second signal to the remote location, the second signal associated with the first signal measurement;
   receive a data signal from the remote location, the data signal comprising information associated with the location, the information comprising an elevation; and
   store the first signal measurement to enable one or more third mobile devices to determine elevation based on second signal measurements.

57. The non-transitory computer readable medium of claim 56, wherein the pressure is measured by one or more of: a barometric pressure sensor, an altitude sensor, an absolute pressure sensor, or a relative pressure sensor.

58. The non-transitory computer readable medium of claim 56, wherein the first signal measurement comprises one or more of a Received Signal Strength Indicator (RSSI) or a Round Trip Time (RTT) measurement.

59. The non-transitory computer readable medium of claim 56, wherein the venue comprises a building with a plurality of floors.

60. The non-transitory computer readable medium of claim 59, further comprising program code, which when executed, is configured to cause the processor to receive information associated with a feature of one or more of the plurality of floors.

* * * * *